(12) United States Patent
Yasuda

(10) Patent No.: US 7,739,995 B2
(45) Date of Patent: Jun. 22, 2010

(54) CYLINDER HEAD GASKET

(75) Inventor: Kishou Yasuda, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 314 days.

(21) Appl. No.: 12/071,546

(22) Filed: Feb. 22, 2008

(65) Prior Publication Data

US 2008/0203677 A1 Aug. 28, 2008

(30) Foreign Application Priority Data

Feb. 22, 2007 (JP) ............................. 2007-042299

(51) Int. Cl.
 *F02F 11/00* (2006.01)
(52) U.S. Cl. ................... 123/195 R; 277/595
(58) Field of Classification Search ............. 123/195 R, 123/193.1; 277/592, 593, 595, 598, 600
See application file for complete search history.

(56) References Cited

FOREIGN PATENT DOCUMENTS

| DE | 692 12 687 T2 | 11/1996 |
|---|---|---|
| DE | 10 2008 008 813 A1 | 8/2008 |
| EP | 1 308 653 A2 | 5/2003 |
| JP | H10-281290 | 10/1998 |

*Primary Examiner*—Noah Kamen
(74) *Attorney, Agent, or Firm*—Manabu Kanesaka

(57) ABSTRACT

A cylinder head gasket for an open deck engine includes a first metal plate having a folded portion extending from a curved portion and located under the base portion, and a second metal plate having an inner portion disposed on the folded portion, an outer portion outside the inner portion and a first half bead provided between the inner and outer portions. An annular bead plate having a full bead is provided on the inner portion of the second metal plate, and an intermediate plate is provided on the outer portion of the second metal plate, wherein an inner end portion of the intermediate plate is disposed under an outer edge of the annular bead plate. A total thickness of the metal plates at the flange is equal to a total thickness of the metal plates outside the flange including the inner end portion.

7 Claims, 5 Drawing Sheets

CYLINDER HEAD GASKET

BACKGROUND OF THE INVENTION AND RELATED ART STATEMENT

The present invention relates to a cylinder head gasket sandwiched between a cylinder head and a cylinder block of an open deck type engine for sealing.

A cylinder head gasket is tightened by head bolts and sandwiched between engine members such as a cylinder head, a cylinder block (cylinder body) or the like, of an automobile engine for sealing fluids such as combustion gas, oil, coolant or the like.

On the other hand, an engine can be distinguished based on a form of a cylinder block into a closed type engine having no coolant passage at a contact surface of a cylinder head at a cylinder block, and an open deck type engine having a contact surface which is open as a coolant passage of a cylinder head at a cylinder block. As shown in FIG. 10, the open deck type engine includes a coolant passage (water jacket) 62 at a portion close to a cylinder head of an engine block 60, and is advantageous in terms of a cooling ability and a reduction in weight thereof. In addition, it is easy to produce the open deck type engine because of an opening portion therein.

Regarding a cylinder head gasket for the open deck type engine, a metal gasket has been provided with a grommet along an inner periphery of a cylinder hole in a base plate to be inserted to bridge a cylinder portion of a cylinder block and an outer wall portion forming an outer side of a coolant passage. The thickest portion of the grommet formed at the inner side of a cylinder sleeve seals combustion gas of a cylinder bore. Also, step beads formed on both sides of the coolant passage seal the coolant (For example, refer to Japanese Patent Document 1: Japanese Patent Publication No. H10-281290).

In the cylinder head gasket, the step beads are provided for sealing the coolant between the coolant passage and the cylinder bore. The step beads have a portion thicker at an inner periphery side and a portion thinner at an outer periphery side on an upper surface of an inner cylindrical portion of the cylinder block. Therefore, when a large pressing force is applied to the step beads, a large surface pressure is applied to the inner periphery side, thereby making the pressing force difficult to be optimized. In addition, a moment, inclining toward inner side, acts on the upper portion of the inner cylindrical portion, thereby deforming the cylinder bore.

The present invention has been made to solve the above-mentioned problems and provides a cylinder head gasket to be used for an open deck type engine. The cylinder head gasket adjusts a surface pressure on an upper surface of a cylinder portion forming a cylinder bore of a cylinder block, thereby reducing deformation of the cylinder bore and preventing the cylinder bore from buckling.

Further objects and advantages of the invention will be apparent from the following description of the invention.

SUMMARY OF THE INVENTION

In order to achieve the objects, a cylinder head gasket according to the present invention is sandwiched between a cylinder block and a cylinder head of an open deck type engine for exerting its sealing ability. The cylinder head gasket comprises a first metal base plate including a folded portion formed at a peripheral portion of a cylinder bore thereof; and a second metal base plate formed by inserting an inner peripheral flat portion of the second metal base plate into the folded portion. The second metal base plate is provided with a first half bead at the outer peripheral side of the inner peripheral flat portion and an outer peripheral side flat portion of the first half bead formed on a side of the folded portion. Furthermore, a circular or annular bead plate having a first full bead projecting toward the first metal base plate is laminated between the inner peripheral flat portion in the second metal base plate and the first metal base plate inside the folded portion.

In the cylinder head gasket, an outer peripheral side end portion of a slope portion of the first half bead is disposed at the inner peripheral side of the outer peripheral position of an inner cylindrical portion forming the cylinder bore of the cylinder block. An outer peripheral side end portion of the bead plate extends to the outer peripheral position of the inner cylindrical portion or a position close to the outer peripheral and forms the bead plate. Furthermore, a flat portion in an intermediate plate is disposed at the outer peripheral side of the first half bead, wherein a total thickness of each metal plate at the position of the first full bead and a total thickness of each metal plate at the position of the outer peripheral side end portion of the bead plate are designed to be equal. With this structure, when a large pressing force is applied to the cylinder head gasket, the total thicknesses at the inner peripheral side and the outer peripheral side of the inner cylindrical portion become equal. Thus, it is possible to equalize the pressing force at the inner peripheral side and the outer peripheral side of the inner cylindrical portion, thereby optimizing a stress generated on the inner cylindrical portion.

In the cylinder head gasket, a second half bead is provided at the outer peripheral side of the inner cylindrical portion of the cylinder block, a third half bead is provided at the outer peripheral side of the outer wall surface of a coolant passage formed around the inner cylindrical portion, and the intermediate plate is formed to space between the second half bead and the third half bead at a side of the first metal base plate. Thus, it is possible to improve the ability for sealing the coolant passage.

In addition, in the cylinder head gasket described above, a third metal base plate is laminated at a side opposite to the folded portion in the first metal base plate, wherein a second full bead is provided with a projection facing a projection of the first full bead. A fourth half bead and a fifth half bead are provided to face the second half bead and the third half bead, respectively, in such a way that a space between the fourth half bead and the fifth half bead faces a side of the second metal base plate. Therefore, sealing abilities for the cylinder bore and the coolant passage can be further improved because of the third metal base plate.

According to the cylinder head gasket of the present invention, the outer peripheral side of the bead plate inside the folded portion is extended to the outer peripheral position of the inner cylindrical portion (block liner) of the cylinder block of an open deck type engine for equalizing the pressing forces at the inner peripheral side and the outer peripheral side of the inner cylindrical portion, thereby optimizing a sealing surface pressure applied to the inner cylindrical portion and a stress generated on the inner cylindrical portion. As a result, deformation of the inner cylindrical portion can be reduced, and buckling can be prevented. Also, a moment inclining toward inside the upper surface and applied to the inner cylindrical portion is reduced, thereby reducing the deformation of the cylinder bore.

DETAILED DESCRIPTION OF PREFERRED EMBODIMENTS

Next, embodiments of a cylinder head gasket according to the present invention will be explained with reference to the drawings. FIGS. 1 to 10 are schematic illustrations showing cylinder bores, cylinder liners, water holes, and beads. The sizes of the cylinder bores and the sizes and shapes of the cylinder lines, water holes, and beads, are made different from the actual ones for convenience in explaining the configuration thereof.

As shown in FIGS. 2 to 9, cylinder head gaskets 1 and 1A according to the embodiments of the present invention are metal gaskets to be sandwiched between engine members such as a cylinder head and a cylinder block (cylinder body) of an open deck type engine for a multi-cylinder engine, and seal fluids such as combustion gas with a high temperature and a high pressure of the cylinder bores, coolant in a coolant passage and oil in a cooling oil passage, and the like.

Figure 1:
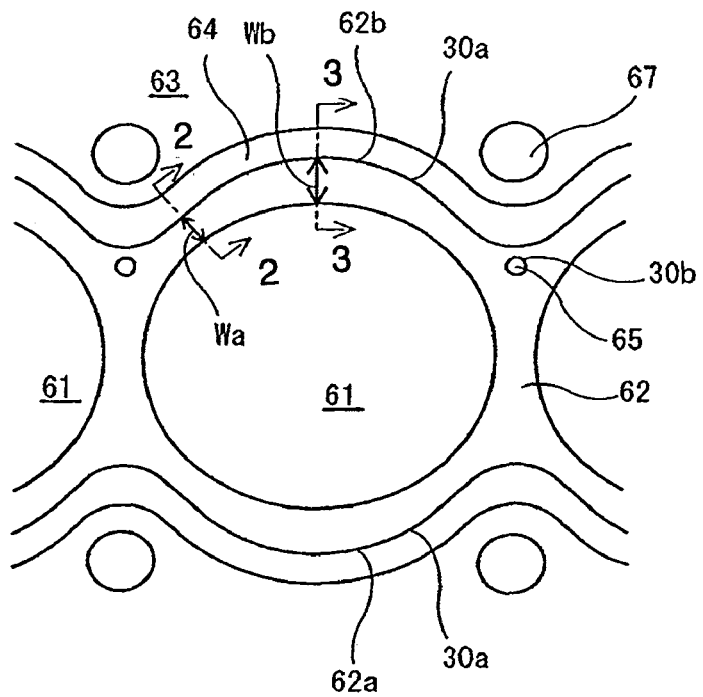
FIG. 1 is a partial top plan view of a cylinder block of an open deck type engine for explanation of a structure of a cylinder head gasket according to a first embodiment of the present invention.
Figure 2:
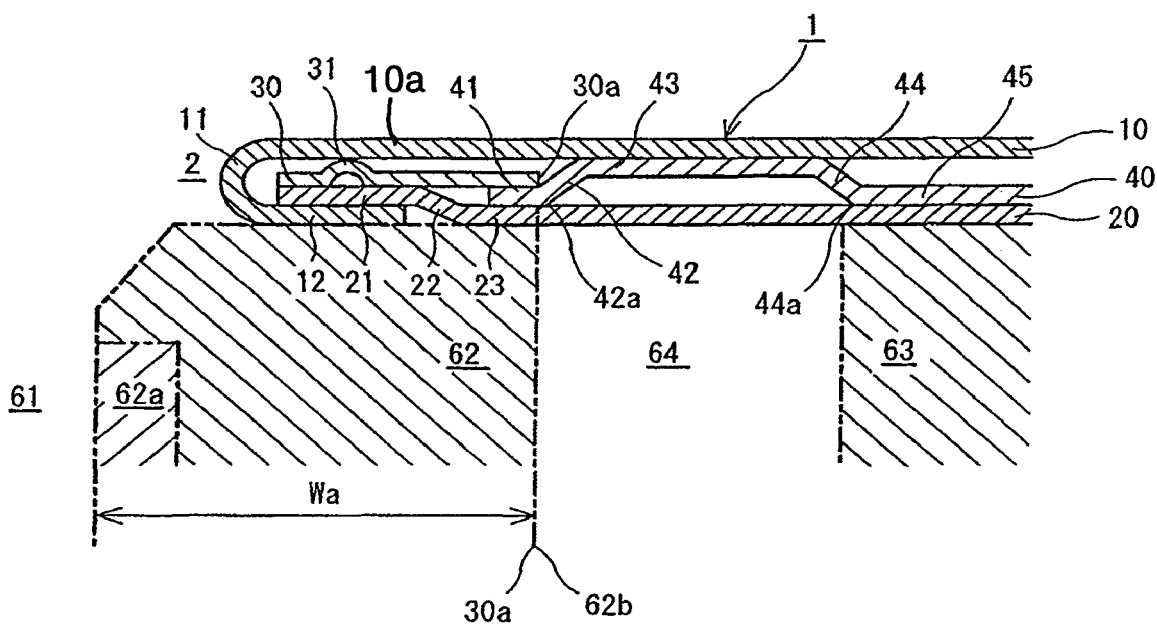
FIG. 2 is a sectional view taken along line 2-2 in FIG. 1 showing the cylinder head gasket according to the first embodiment of the present invention.
Figure 3:
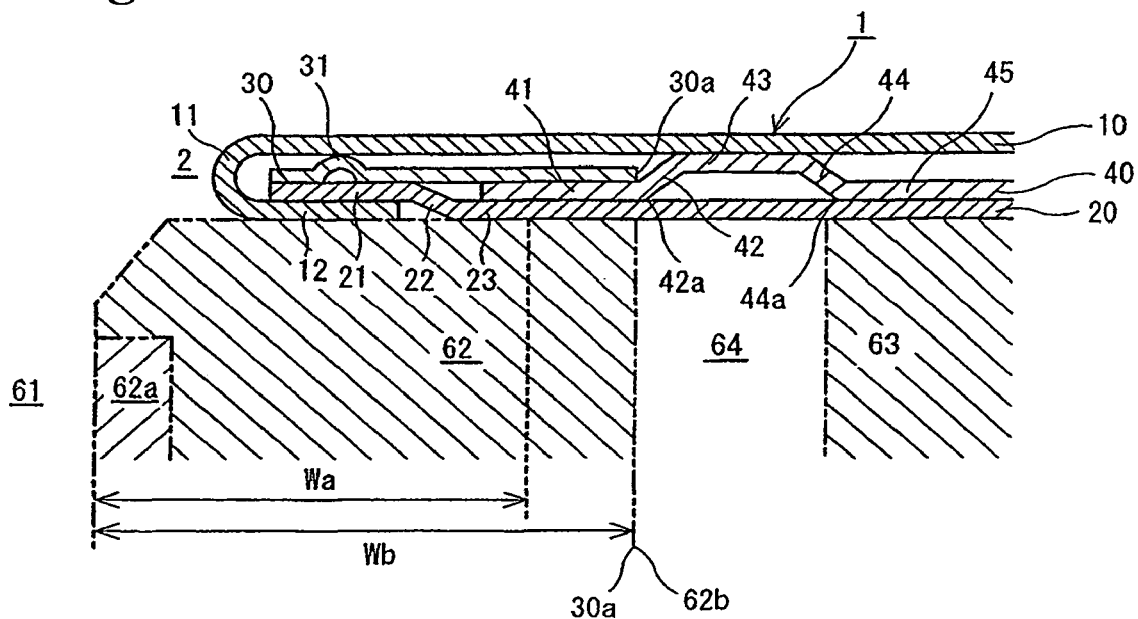
FIG. 3 is a sectional view taken along line 3-3 in FIG. 1 showing the cylinder head gasket according to the first embodiment of the present invention.
Figure 4:
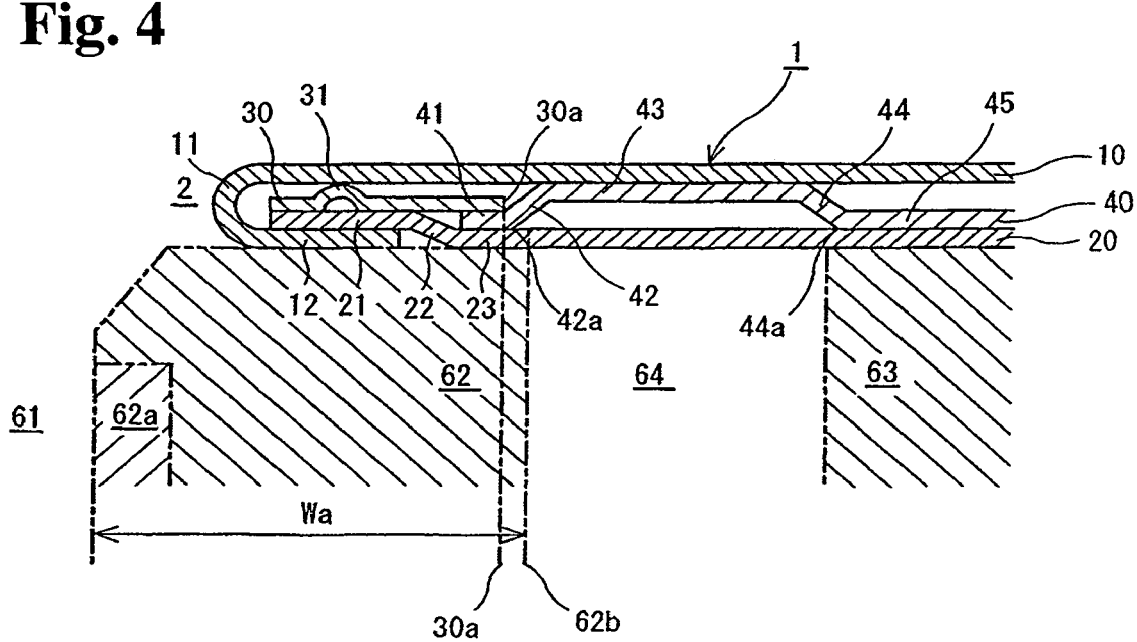
FIG. 4 is a partial sectional view showing another cylinder head gasket according to the first embodiment of the present invention corresponding to the sectional view taken along line 2-2 in FIG. 1.
Figure 5:
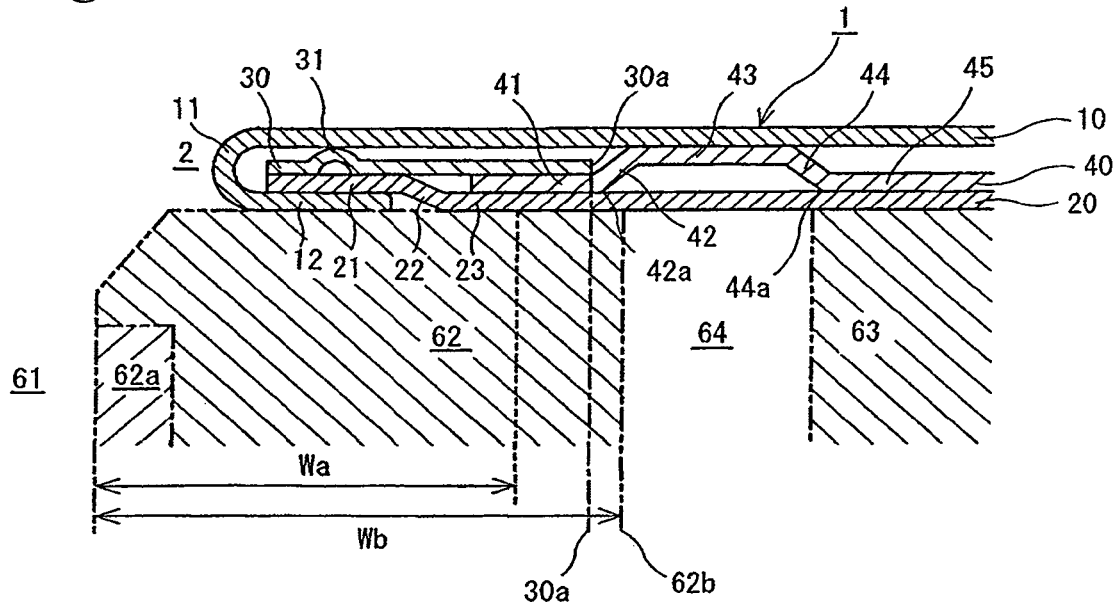
FIG. 5 is a partial sectional view showing another cylinder head gasket according to the first embodiment of the present invention corresponding to the sectional view taken along line 3-3 in FIG. 1.
Figure 6:
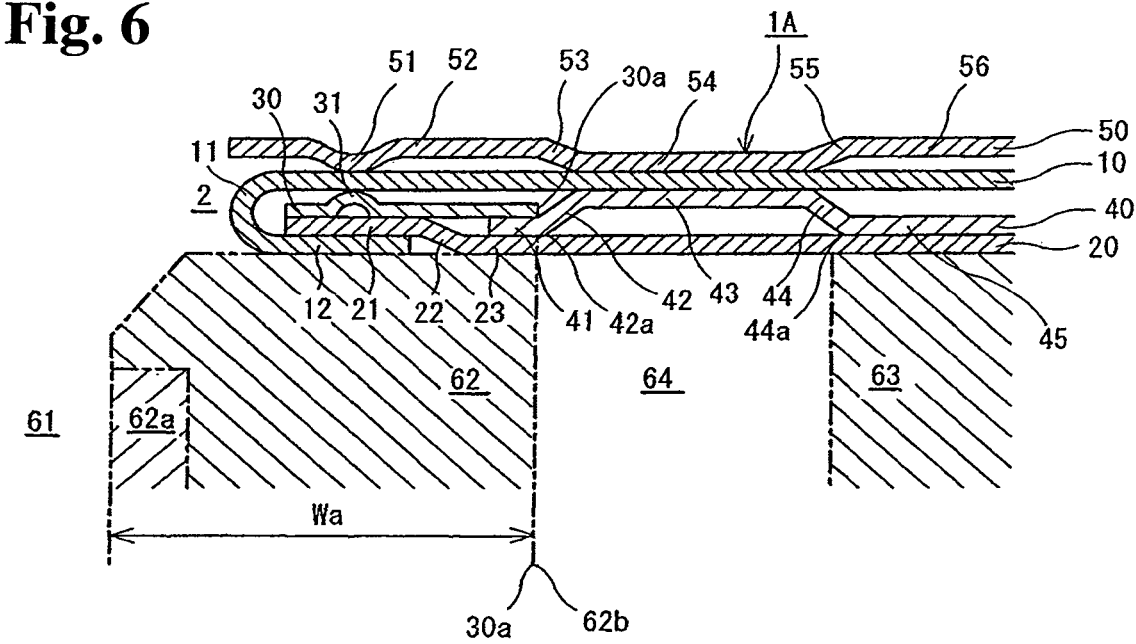
FIG. 6 is a partial sectional view showing a cylinder head gasket according to a second embodiment of the present invention corresponding to the sectional view taken along line 2-2 in FIG. 1.
Figure 7:
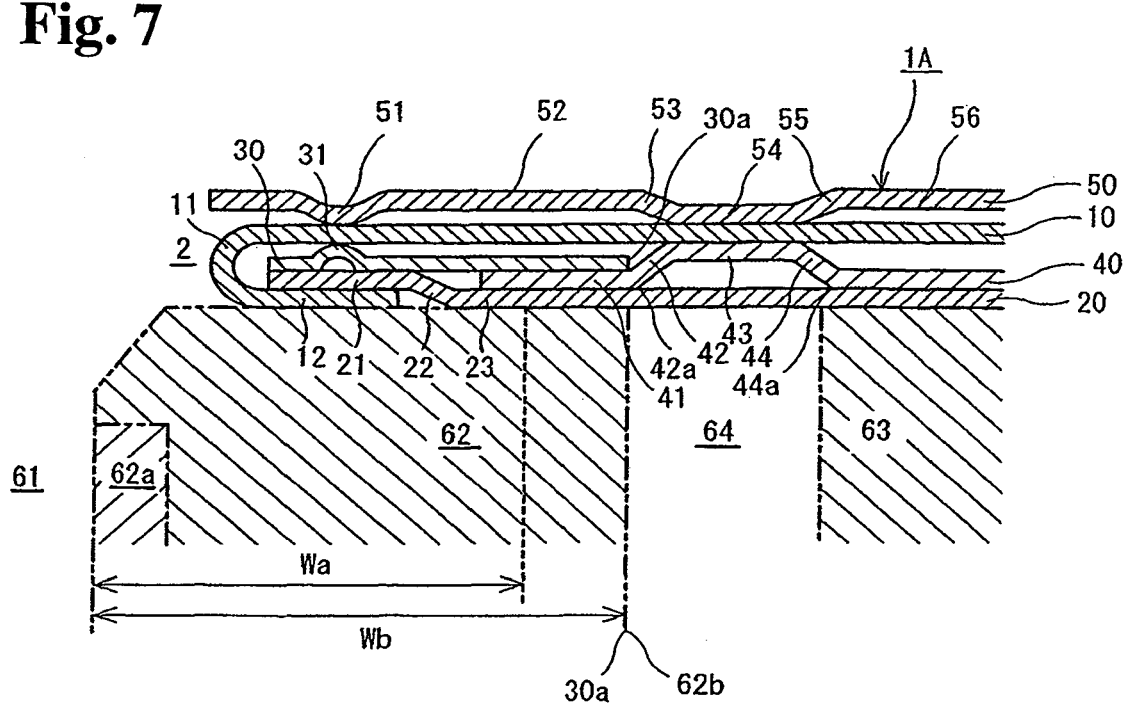
FIG. 7 is a partial sectional view showing the cylinder head gasket according to the second embodiment of the present invention corresponding to the sectional view taken along line 3-3 in FIG. 1.
Figure 8:
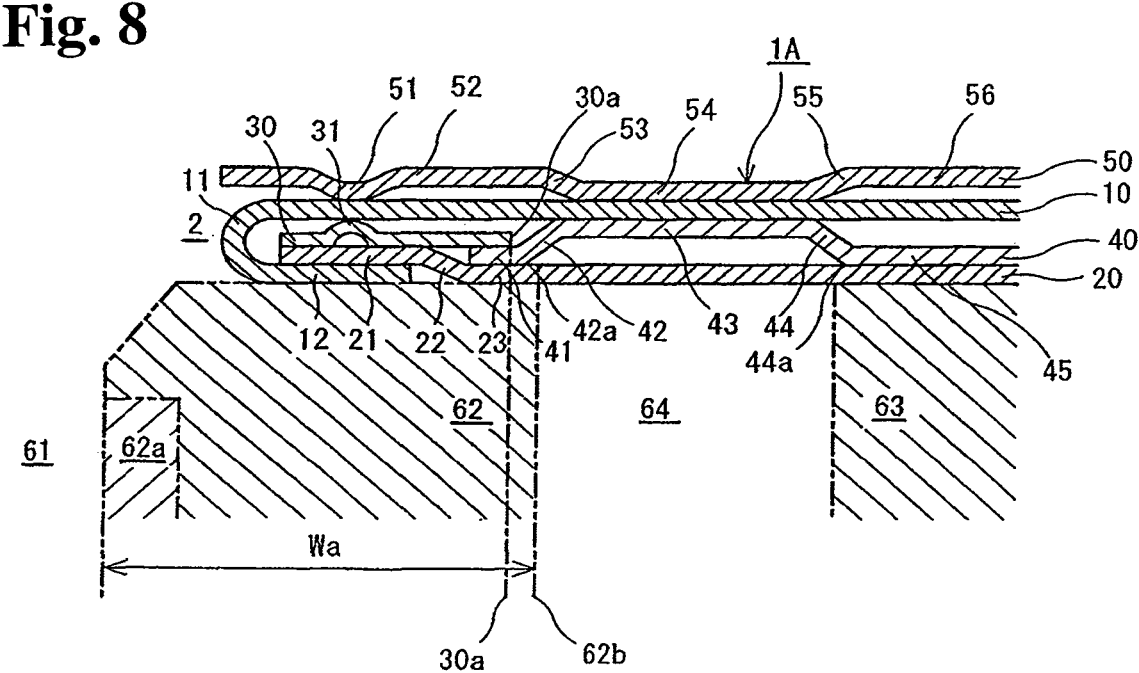
FIG. 8 is a partial sectional view showing another cylinder head gasket according to the second embodiment of the present invention corresponding to the sectional view taken along line 2-2 in FIG. 1.
Figure 9:
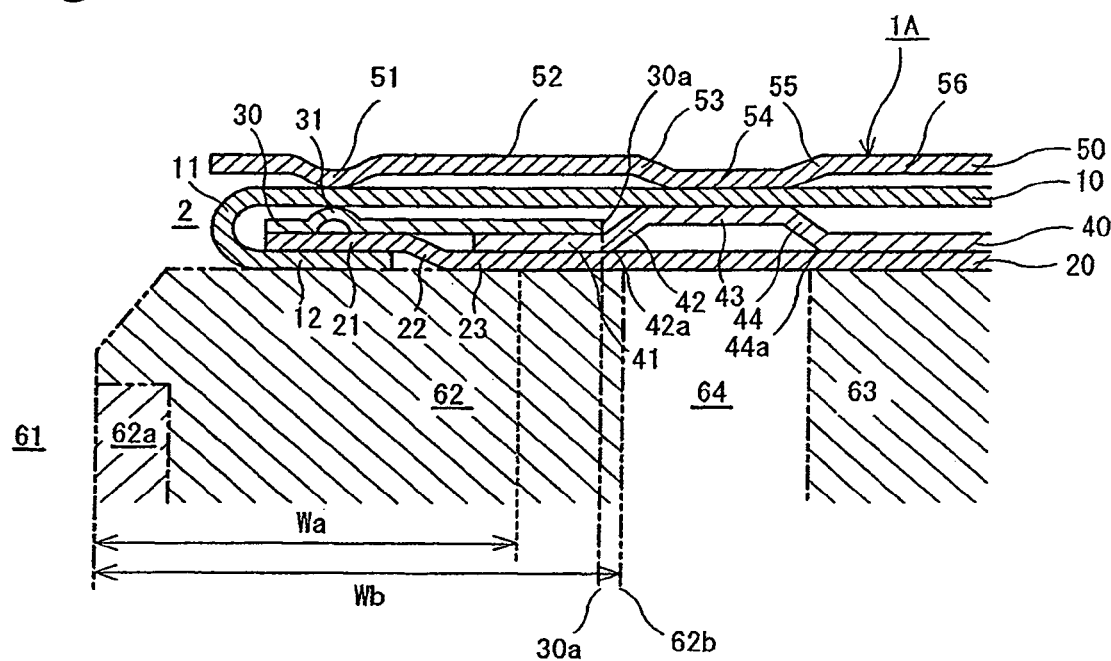
FIG. 9 is a partial sectional view showing another cylinder head gasket according to the second embodiment of the present invention corresponding to the sectional view taken along line 3-3 in FIG. 1.
Figure 10:
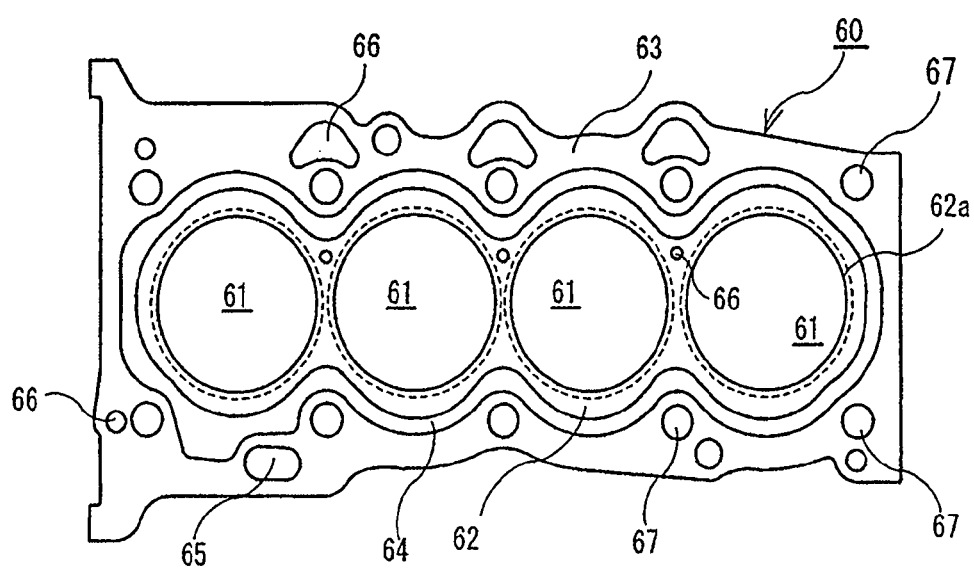
FIG. 10 is a top plan view showing an example of a conventional type cylinder block of an open deck type engine.

In the open deck type engine with such cylinder head gaskets 1 and 1A, as shown in FIGS. 1 and 10, a cylinder block 60 is formed of a cylinder portion (block liner) 62 provided with a cylinder bore 61 and an outer wall portion 63. A coolant passage (water jacket) 64 is formed by the inner cylindrical portion 62 and the outer wall portion 63. Also, water holes 65, oil holes 66, and bolt holes 67 for tightening bolts are provided in the outer wall portion 63. The water holes 65 are also provided in the cylinder portion 62.

The cylinder portion 62 is engaged with a cylinder sleeve (cylinder liner) 62a at a side of the cylinder bores 61. The cylinder sleeve 62a is formed of a special cast iron with an abrasion resistance, a sear resistance, a heat resistance, and strength. The cylinder portion 62 and the outer wall portion 63 are formed of an aluminum alloy with light weight properties.

In the cylinder block 60 of the open deck type engine, the coolant passage 64 is opened on a contact surface of the cylinder block 60 with the cylinder head. Thus, it is difficult to maintain the rigidity thereof, thereby easily deforming the bores. However, an advantage in a cooling ability can be obtained and it is easy to cast.

As shown in FIGS. 2 to 5, the cylinder head gasket 1 according to the first embodiment of the present invention comprises a first metal base plate (a first surface plate) 10, a second metal base plate (a second surface plate) 20, a bead plate 30, and an intermediate plate 40. The first and second metal base plates 10, 20, the bead plate 30, and the intermediate plate 40 are formed of a mild steel plate, a stainless annealed material (anneal material), stainless thermal refining steel material (spring steel plate), and the like. Especially, an anneal material with heat resistance and corrosion resistance is used for the first metal base plate 10. A spring material with elasticity can be used for the bead plate 30.

In addition, these metal base plates 10, 20, and 40 are produced so that they correspond to the shapes of the engine members such as a cylinder block and the like, and provided with cylinder bores (combustion chamber holes) 2, water holes for circulation of the coolant (not shown), oil holes for circulation of lubricant oil (not shown), head bolt holes for tightening head bolt (not shown) therein.

As shown in FIGS. 2 to 5, a curved portion 11 and a folded portion (flange portion) 12 are formed by folding the first surface plate 10 at a periphery portion of the cylinder bore 2. The second surface plate 20 is formed by inserting an inner peripheral flat portion 21 into the folded portion 12. The second surface plate 20 is provided with a first half bead 22 gradually inclining toward the folded portion 12 at the outer periphery side of the inner peripheral flat portion 21. An outer peripheral side flat portion 23 of the first half bead 22 is provided at a side of the folded portion 12 in a direction of the thickness.

The bead plate 30 in a circular or annular shape is laminated on the inner peripheral flat portion 21 between the inner peripheral flat portion 21 in the second metal base plate 20 and a base portion 10a of the first metal base plate 10 inside the folded portion 12. The bead plate 30 is provided with a first full bead 31 projecting toward the base portion 10a of the first surface plate 10 therein.

Moreover, the intermediate plate 40 is disposed between the outer peripheral side flat portion 23 and the base portion 10a of the first metal base plate 10. The intermediate plate 40 is provided with a second half bead 42 gradually sloping from the inner peripheral side to the outer peripheral side toward the base portion 10a of the first base metal plate 10 from the second metal base plate 20. Also, the intermediate plate 40 is provided with a third half bead 44 gradually sloping down from the inner peripheral side to the outer peripheral side toward the second metal base plate 20 from the base portion 10a of the first metal base plate 10 at the outer peripheral side of the coolant passage 64, i.e. above the outer wall portion 63. An inner peripheral flat portion 41 formed at the inner peripheral side of the second half bead 42 is disposed at the outer peripheral side of the first half bead 22.

According to the structure, the folded portion 12 prevents the combustion gas from contacting the second metal base plate 20 and the bead plate 30. Therefore, a material with heat and corrosion resistances can be used for the first metal base plate 10, and a material with elasticity can be used for the second metal base plate 20 and the bead plate 30. Accordingly, it is possible to form the gasket 1 of a combination of materials having properties different from each other. As a result, it is possible to produce the gasket with excellent properties in sealing ability, heat resistance, corrosion resistance, durability, and the like.

The first half bead 22 is provided, so that the inner peripheral flat portion 21 thereof can be easily stored inside the folded portion 12. Even if a width of a guard portion of the inner cylindrical portion 52 is narrow, it is still possible to insert the inner peripheral flat portion 21 as a part of the second metal base plate 20 into the folded portion 12. Therefore, elasticity of the folded portion 12 can be improved, and cracking due to a stopping function of the inner peripheral flat portion 21 can be prevented.

In the present invention, as shown in FIGS. 1 to 5, the outer peripheral side end portion of the slope portion of the first half bead 22 is disposed closer to the inner peripheral side than the outer peripheral position 62b of the inner cylindrical portion 62 forming the cylinder bore of the cylinder block 60. An outer peripheral side end portion 30a of the bead plate 30 extends to an outer peripheral position 62a (FIGS. 1 to 3) of the inner cylinder portion 62 or a position (FIGS. 4 and 5) close to the outer peripheral position 62a for forming the bead plate 30. Additionally, the flat portion 41 in the intermediate plate 40 is disposed at the outer peripheral side of the first half bead 22, and a total thickness of the metal plates 10, 30, 20, and 40 at the position of the first full bead 31 and a total thickness of the metal plates 10, 30, 40, and 20 at the outer peripheral position 62b of the inner cylindrical portion 62 are equalized.

With this structure, when a large pressing force is applied to the cylinder head gasket 1, the total thicknesses at the inner peripheral side and at the outer peripheral side of the inner cylindrical portion 62 become equal. Accordingly, the pressing forces at the inner peripheral side and at outer peripheral side of the inner cylindrical portion 62 can be equalized, thereby optimizing the stress generated on the inner cylindrical portion 62. According to the experimental results in which the cylinder head gasket 1 with the structures in FIGS. 1 to 3 has been used, an average of amount of distortion at four portions is reduced by 9%.

Incidentally, as an example of the plate thicknesses described above, the first metal base plate 10 and the intermediate plate 30 are formed of a plate thickness t1, respectively, the second metal base plate 20 is formed of a plate thickness t2 ($t2=1.2 \times t1$), and the bead plate 30 is formed of a plate thickness t3 ($t3=0.6 \times t1$).

Next, a second embodiment of the present invention will be explained. As shown in FIGS. 6 to 9, the cylinder head gasket 1A according to the second embodiment of the present invention comprises a third metal base plate 50 laminated at a side opposite to the folded portion 12 in the first metal base plate 10 in addition to the structure of the cylinder head gasket 1 according to the first embodiment. The third metal base plate 50 is provided with a second full bead 51 projecting toward the first full bead 31, said both first and second beads facing each other. Furthermore, a fourth half bead 53 and a fifth half bead 55 are provided to face the second half bead 42 and the third half bead 44, respectively, in such a way that a flat portion 54 between the fourth half bead 53 and the fifth half bead 55 is provided at a side of the second metal base plate 20.

According to the structure with the third metal base plate, the second full bead 51 is overlapped with the first full bead 31, the fourth half bead 53 and the fifth half bead 55 are overlapped with the second half bead 42 and the third half bead 44, respectively. Therefore, it is possible to generate large sealing surface pressures at those portions, thereby further improving sealing abilities for the cylinder bore 61 and the coolant passage 64.

As an example of the plate thicknesses described above, the first metal base plate 10 and the intermediate plate 30 are formed of a plate of thickness t1, respectively. The second metal base plate 20 is formed of a plate of thickness t2 ($t2=1.2 \times t1$). The bead plate 30 is formed of a plate of thickness t3 ($t3=0.6 \times t1$). In addition, the third metal base plate 50 is formed of a plate of thickness t4 ($t4=0.8 \times t1$).

The disclosure of Japanese Patent Application No. 2007-042299, filed on Feb. 22, 2007, is incorporated in the application.

While the invention has been explained with reference to the specific embodiments of the invention, the explanation is illustrative and the invention is limited only by the appended claims.

What is claimed is:

1. A cylinder head gasket for sealing between a cylinder block and a cylinder head of an open deck engine, comprising:
    a first metal plate having a base portion, a curved portion extending from the base portion for defining a cylinder bore of the engine, and a folded portion extending from the curved portion and located under the base portion;
    a second metal plate having an inner portion disposed on the folded portion, an outer portion outside the folded portion, and a first half bead provided between the inner and outer portions and extending in a direction away from the base portion;
    an annular bead plate provided on the inner portion of the second metal plate, and having a first full bead projecting toward the base portion, and an outer edge; and
    an intermediate plate provided on the outer portion of the second metal plate and having an inner end portion disposed under the outer edge of the annular bead plate,
    wherein a total thickness of the metal plates at the flange is equal to a total thickness of the metal plates outside the flange including the inner end portion.

2. A cylinder head gasket according to claim 1, wherein the intermediate plate comprises second and third half beads projecting toward the base portion outside the inner end portion with a predetermined distance away from each other.

3. A cylinder head gasket according to claim 2, further comprising a third metal plate provided on the base portion of the first metal base plate, the third metal plate including a second full bead projecting toward and located above the first full bead, and fourth and fifth half beads arranged substantially symmetrically to the second and third half beads, respectively, with respect to the base portion.

4. A combination comprising an open deck engine having a cylinder portion, a cylinder block and a water jacket between the cylinder portion and the cylinder block, and the cylinder head gasket according to claim 1, wherein the first half bead and the outer edge of the bead plate are located on the cylinder portion without projecting to the water jacket.

5. A combination according to claim 4, wherein the intermediate plate comprises second and third half bead with inclining portions projecting toward the base portion outside the inner end portion, the inclining portions of the second and third half beads being substantially located above the water jacket.

6. A combination according to claim 5, wherein the inner end portion of the intermediate plate is located on the cylinder portion, and the annular bead plate is located only on the cylinder portion.

7. A combination according to claim 6, further comprising a third metal plate provided on the base portion of the first metal base plate, the third metal plate including a second full bead projecting toward and located above the first full bead, and fourth and fifth half beads arranged substantially symmetrically to the second and third half beads, respectively, with respect to the base portion.

* * * * *